Dec. 5, 1961   J. A. AMORI   3,011,620
SUPPORTING FRAME FOR A FRUIT ORIENTING ROLLER BELT
Filed Aug. 16, 1960
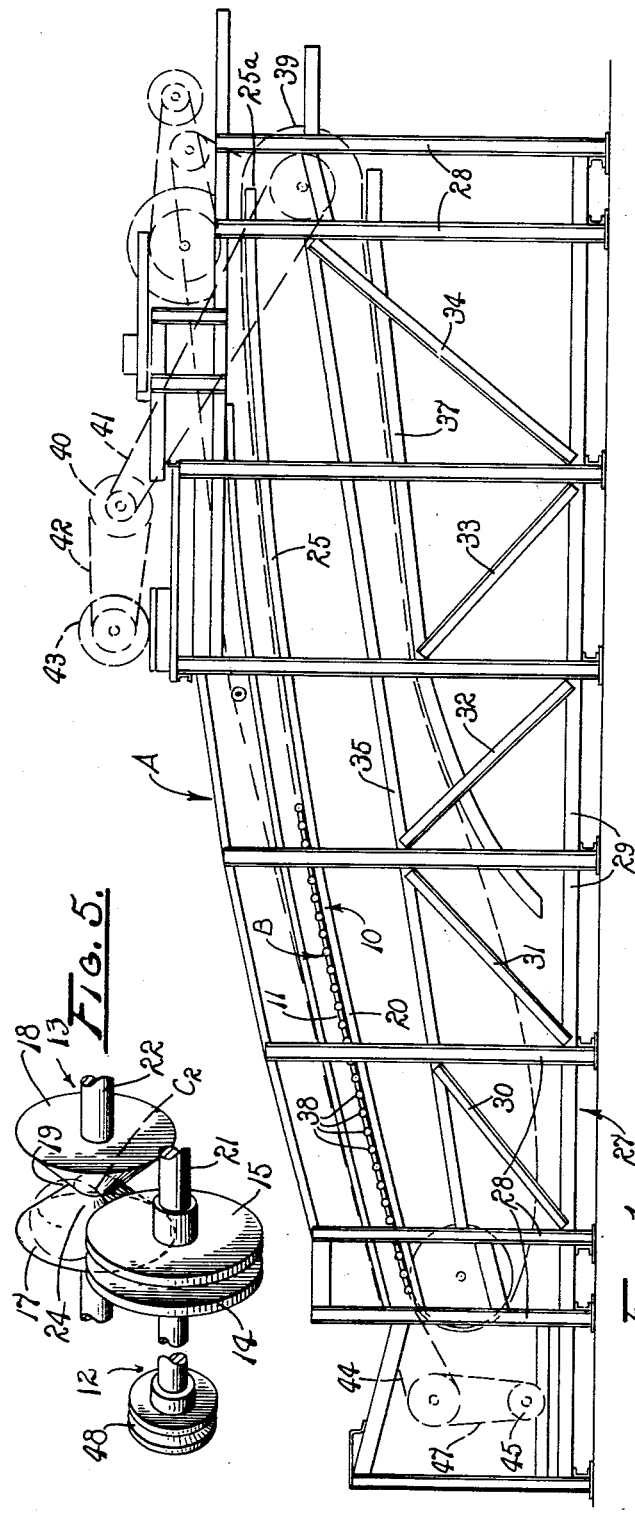
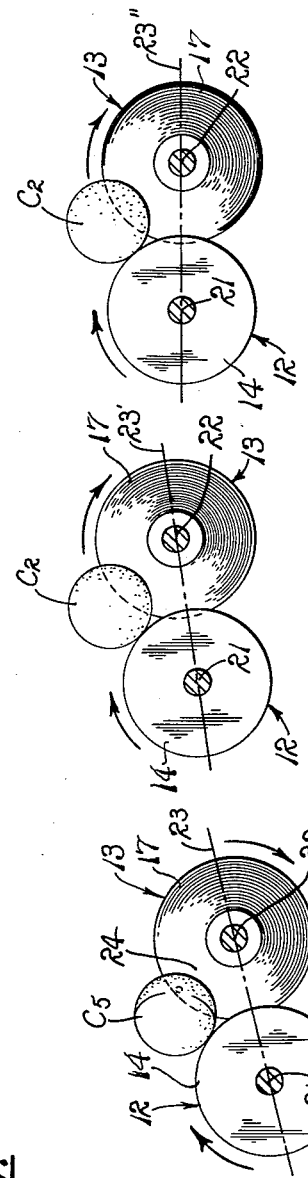
JOSEPH A. AMORI
INVENTOR
BY Hansen and Lane
ATTORNEYS

3,011,620
SUPPORTING FRAME FOR A FRUIT ORIENTING ROLLER BELT
Joseph A. Amori, 1596 Davis, San Jose, Calif.
Filed Aug. 16, 1960, Ser. No. 49,877
4 Claims. (Cl. 198—33)

The present invention relates to fruit orienting mechanisms, and pertains more particularly to an improvement in a support frame for a belt having fruit aligning pockets therein defined by alternate rollers driven to rotate at different peripheral speeds.

In the processing of drupe type fruit, such as peaches and apricots, advantage is taken of the fact that such fruit has two major axes and one minor axis, and the further fact that the suture line of such fruit is usually disposed in the plane defined by the two major axes. Centerless rotation of such a fruit causes it to orient itself with its minor axis disposed transversely of its direction of rotation, which disposes the suture line, in the plane of such rotation. With the fruit rotating in this manner, when the fruit is presented to a cutting blade centered on the fruit, the flesh of the fruit is severed on the plane of the suture line.

In my previous Patents Nos. 2,622,719, 2,713,934, 2,801,660 and 2,827,089, I have disclosed fruit processing mechanism employing a fruit carrying and orienting belt comprising pairs of alternately arranged, differently shaped rollers. One of the rollers of each pair thereof comprises a plurality of pairs of disks secured co-axially on a shaft journaled to extend transversely of the belt. The other roller of each pair thereof comprises a plurality of truncated cones, also arranged in pairs with their truncated ends adjacent each other and secured co-axially on a shaft extending transversely of the belt.

Each pair of the double disks on one roller of each pair thereof is mounted in line with the opposed truncated smaller ends of a pair of the cones of the other roller in the direction of belt travel, and is spaced therefrom by a distance sufficient to provide a pocket between said disks and cones for supporting a fruit in such pocket. Both sets of the rollers are driven in the same direction, but at different peripheral speeds, to thereby produce a centerless rotation of a fruit supported in each such pocket for orienting such fruit in the desired position as set forth in the patents enumerated previously herein.

In the machines disclosed in said patents, and employing a straight, upper, belt supporting frame member, when each fruit arrived over the upper belt sprocket, such fruit was suddenly transferred from a position wherein a major portion of the weight of such fruit was borne by the more rapidly spinning double disc elements defining the rear side of each fruit receiving pocket in the belt, toward a position where more of the weight was transferred onto the more slowly rotating double conical elements defining the forward side of each such pocket. This rapid weight transfer of the fruit tended to suddenly reduce the rotative frictional driving force imparted to the fruit by the double disk elements upon which the fruit was principally supported during its travel up the straight, inclined belt support member of the prior frame as shown in said patents, with the result that some of the fruit was thereby bounced out of its oriented position attained during its upward travel on the belt and was thus improperly presented to the halving knives.

An object of the present invention is to provide a frame for supporting a fruit orienting roller belt of the type comprising alternate rollers arranged in pairs and with the rollers of each pair thereof driven to rotate at different speeds, which frame provides for a gradual transition of the weight of a fruit supported in an orienting pocket defined by a pair of said rollers from one toward the other of such pair of rollers as each such fruit approaches the upper end of such curved frame member, thereby to gradually change the rotative frictional driving force applied to such fruit by the supporting rollers.

Another object of the invention is to provide an improved belt support for a roller belt having alternate rollers of different shape therein, together with means for driving the rollers of each type to rotate at different speeds thereby to gradually change the rotative driving force applied to such fruit by its supporting rollers without changing the rotative speed of the rollers.

The foregoing, and other objects and advantages of the invention, will be apparent from the following description and the accompanying drawings, wherein:

FIG. 1 is a side elevational view of a frame for a fruit processing mechanism of the same general type as that disclosed in my prior Patents Nos. 2,622,719, 2,713,934, 2,801,660 and 2,827,089 mentioned previously herein, an upper belt supporting member of said frame embodying the present invention, other portions of the machine being shown somewhat diagrammatically.

FIGS. 2, 3 and 4 are generally similar, enlarged, fragmentary, transverse sectional views through a pair of fruit rotating rollers employed in the fruit orienting belt of the machine shown in FIG. 1, and showing said pair of rollers at different stages of their progress along the upper belt supporting upper frame member of FIG. 1, a fruit being shown in each of said figures supported in a pocket defined by the rollers.

FIG. 5 is a fragmentary, perspective view showing one pair of double disc members provided on one of the rollers of FIGS. 2–4, and an opposed, co-operating pair of double conical members provided on the other roller of FIGS. 2–4, an apricot being shown supported in oriented condition in the pocket defined therebetween.

Briefly, the invention comprises a pair of curved frame members 10, one on each side of a fruit processing mechanism A, for supporting the upper or working run 11 of a fruit orienting belt B comprising alternately arranged, paired rollers 12 and 13. The rollers 12 are the rearmost of each pair 12 and 13 thereof, and are driven to rotate at a uniform speed, while traveling along the upper belt support members 11. This speed is substantially greater than that of the other roller 13 of each pair thereof, and in the same direction. Each rearmost roller 12 comprises a plurality of pairs of disks 14 and 15 (FIG. 5) mounted co-axially thereon and spaced axially slightly apart, while each foremost roller 13 comprises the same plurality of pairs of truncated cones 17 and 18, mounted co-axially thereon and with their truncated ends abutting at 19 as shown in FIG. 5. The central abutting portion 19 of each pair of cones 17 and 18 on each foremost roller 13 is centrally aligned in the direction of travel of the belt B, with a pair of the disks 14 and 15 on the rearmost roller 12 associated therewith, and is spaced therefrom to define a fruit supporting pocket 24 between each pair of such disks and the associated pair of cones forwardly thereof.

A straight, initial, lower portion 20 of each belt supporting frame member 10 is disposed at a substantial slope from the horizontal, so that the axes 21 and 22 (FIGS. 2–4) of each co-operating pair of rollers 12 and 13 of the portion of the belt B supported thereon will be offset vertically from each other as indicated by the line 23 in FIG. 2, which line indicates the plane defined by such axes. With the rollers in this position of FIG. 2 a fruit $C_2$ supported in pocket 24 therebetween will have a large portion of its weight supported on the more rapidly rotating disks 14 defining the rear side of such pocket. Such fruit will thus be driven rotatively at a relatively high speed by its frictional engagement with these disks.

As each pair of rollers 12 and 13 passes along over the curved upper portions 25 of the belt supporting frame members 10, however, the axes 21 and 22 of such pair of rollers will gradually approach the same horizontal plane as indicated by the lines 23' in FIG. 3 and 23" in FIG. 4. During this transition the weight of such fruit $C_2$ will be transferred gradually forwardly toward the more slowly rotating conical roller 13, thereby decreasing proportionately the portion of the weight borne by the rearmost double disk roller 12. This weight transfer toward the more slowly rotating rollers 13 reduces the frictional driving effect of the higher speed disk rollers 12, and increases the frictional drag effect of the slower speed conical rollers 13 on the fruit, thereby causing a gradual reduction in the speed of fruit rotation.

Referring to the drawings in greater detail, the fruit processing mechanism A shown in FIG. 1 comprises a frame 27 of structural steel members comprising a plurality of upright members 28, bottom horizontal bracing members 29, diagonal bracing members 30, 31, 32, 33 and 34, and longitudinal diagonal bracing members 35. A lower orienting belt supporting frame member 37 and one of the arched, upper belt support frame members 10 are provided on each side of the frame structure 27, and support the fruit orienting belt B thereon by rollers 38 which are provided along each side of the roller belt B and have rolling support on the belt support frame members 10 and 37 as described in my patents mentioned previously herein.

The details of the structure, mounting and driving mechanism of the fruit orienting belt B for supported, rolling movement along the frame members 10 and 37 are clearly disclosed in prior Patents Nos. 2,622,719, 2,713,934, 2,801,660 and 2,827,089, and need not therefore be repeated herein. The roller belt B is advanced along the belt supporting frame members 10 and 37 by a head sprocket 39, which in turn is driven through a conventional speed reducer 40 and drive chains 41 and 42 by an electric motor 43.

A conventional V-belt 44, driven at a required speed by a motor 45 through a drive belt 47 rides on pulleys 48 secured one to the shaft of each of the double disk rollers 12, while a similar belt, similarly driven at a slower speed, not shown herein, but which is clearly disclosed in Patents Nos. 2,622,719, 2,713,934, 2,801,660 and 2,827,089, drives the double conical rollers 13 at a slower speed, but in the same direction.

The straight lower portion 20 of each upper belt supporting frame member 10 is inclined from the horizontal at a substantial slope, so that each fruit C riding in a pocket 24 (FIG. 5) between a pair of the double disc roller elements 14 and 15 and a pair of the double conical roller elements 17 and 18, as shown in FIGS. 2 and 5, has a substantial portion of its weight supported by the double disc elements in contact with the rear side thereof. Due to this weight distribution the frictional driving effect of the double disc elements causes the fruit C to be rotated rapidly in its pocket 24, slipping somewhat on the slower moving double conical elements 17 and 18 in contact with the forward side thereof.

The upper end portions 25 of the belt support frame members 10 are curved toward the horizontal and their extreme upper ends 25a are substantially tangent to the horizontal. As each co-operating pair of rollers 12 and 13 defining the fruit receiving pockets 24 therebetween rides over these curved upper end portions 25 the angle between the plane defined by the roller axes, and indicated, respectively, by the lines 23 in FIG. 2, 23' in FIG. 3, and 23" in FIG. 4, gradually approaches zero degrees. During this transition the portion of the weight of a fruit C supported in a belt pocket 24 is gradually reduced on the rearward double disk elements 14 and 15 in contact therewith, while the portion of such weight borne by the double conical elements 17 and 18 in contact therewith is progressively increased. This transfer of weight, and thereby of frictional driving effect, from the more rapidly rotating double disk elements 14 and 15 toward the more slowly rotating conical elements 17 and 18 results in a slowing down of the rotational speed of each fruit C as it is carried along over the curved upper portion 25 of the belt supporting frame members 10. By the time each such fruit passes over the top center of the drive sprocket 39 at which point the V-belt driving effect on the rollers 12 and 13 is removed, each fruit is rotating at a sufficiently slow rate of speed that there is then no tendency for such fruit to jump out of its suture-aligned position as has been the case with the straight roller belt supporting frame members disclosed in the patents mentioned previously herein.

The present invention provides a simple and effective cure for what has been a troublesome feature of the straight frame constructure of applicant's prior machines as disclosed in the patents mentioned previously herein. The invention may be readily incorporated in any machine employing an orienting belt with pockets defined between adjacent rollers thereof which rollers are driven to rotate at substantially different peripheral speeds for producing a centerless rotative driving effect on spheroidal objects riding in such pockets. Also, the invention can readily be incorporated either as an original feature of a new machine or as a replacement feature for an existing machine at very little expense.

While I have illustrated and described a preferred embodiment of the present invention, it will be understood, however, that various changes and modifications may be made in the details thereof without departing from the scope of the invention as set forth in the appended claims.

Having thus described the invention, what I claim as new and desire to protect by Letters Patent is defined in the following claims:

1. In a machine for orienting spheroidal objects having two major axes and one minor axis by centerless rotation of each of such objects in supported position in a pocket defined between an adjacent pair of axially parallel rollers and driven rotatively in the same direction and at different speeds, a plurality of said pairs of rollers being linked together in the form of a belt, and said belt being driven to advance lengthwise thereof; a belt support member for supporting an operative run of such belt, a lower initial portion of said belt support member inclined from the horizontal sufficiently to cause a major portion of the weight of one of such objects supported in a pocket defined between a pair of said rollers traversing said lower portion of the belt support member to be borne by the rearmost of said pair of rollers, and an upper portion of said belt support member continuous with said lower initial portion and approaching the horizontal toward its upper end to thereby gradually shift a portion of the weight of such supported object toward the foremost of said latter pair of rollers, thereby reducing the frictional driving effect of the rearmost, and increasing that of the foremost, of said latter pair of rollers on such object.

2. An arrangement according to claim 1 wherein the foremost roller of each adjacent pair thereof comprises a plurality of pairs of similar disks, mounted co-axially and spaced apart axially by a distance substantially less than the diameter of an object to be oriented, and the foremost roller of each pair thereof comprises a similar plurality of pairs of truncated cones, arranged co-axially and with their truncated ends adjacent each other and centrally in line, in the direction of belt travel, with the center of the space between a pair of said disks to define therewith an object receivng pocket.

3. In a machine for orienting spheroidal objects having two major axes and one minor axis by centerless rotation of each of such objects in supported position in a pocket defined between an adjacent pair of axially parallel rollers driven rotatively in the same direction and at different speeds, a plurality of said pairs of rollers being linked together in the form of a belt, and said belt being driven to advance lengthwise thereof; a belt support member for supporting an operative run of such belt, a lower initial portion of said belt support member straight and inclined from the horizontal sufficiently to cause a major portion of the weight of one of such objects supported in a pocket defined between a pair of said rollers traversing said straight lower portion of the belt support member to be borne by the rearmost of said latter pair of rollers, and an upper portion of said belt support member continuous with the straight lower portion and approaching the horizontal toward its upper end to thereby gradually shift a portion of the weight of such object toward the foremost of said latter pair of rollers, thereby reducing the frictional driving effect of the rearmost, and increasing that of the foremost, of said latter pair of rollers on such object.

4. In a machine for orienting spheroidal objects having two major axes and one minor axis by centerless rotation of such objects in supported position between an adjacent pair of axially parallel rollers driven rotatively in the same direction and at different speeds, a plurality of said pairs of rollers being linked together in the form of a belt; a belt support member for supporting an operative run of such belt, a lower initial portion of said belt support member inclined from the horizontal sufficiently to cause a major portion of the weight of one of such objects supported between a pair of said rollers traversing said lower portion of the belt support member to be borne by the rearmost of said latter pair of rollers and an upper portion of said belt support member gradually approaching the horizontal toward its upper end to thereby shift the weight of such object toward the foremost of said latter pair of rollers, thereby reducing the frictional driving effect of the rearmost, and increasing that of the foremost, of said latter pair of rollers on such object.

References Cited in the file of this patent
UNITED STATES PATENTS
2,827,089   Amori _____ Mar. 18, 1958